June 2, 1970  R. GAMBINI  3,515,029
DEVICE FOR REMOVING THE BURR FROM THE ENDS
OF CYLINDRICAL PARTS
Filed Aug. 30, 1968  2 Sheets-Sheet 1
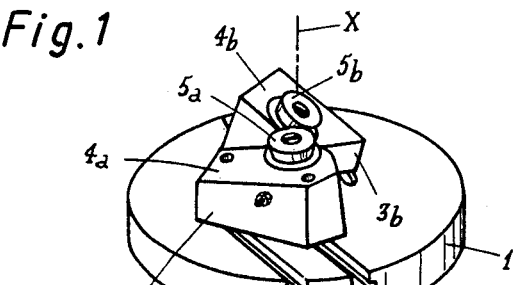
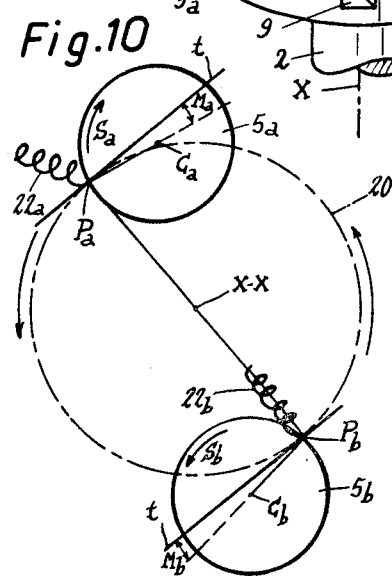
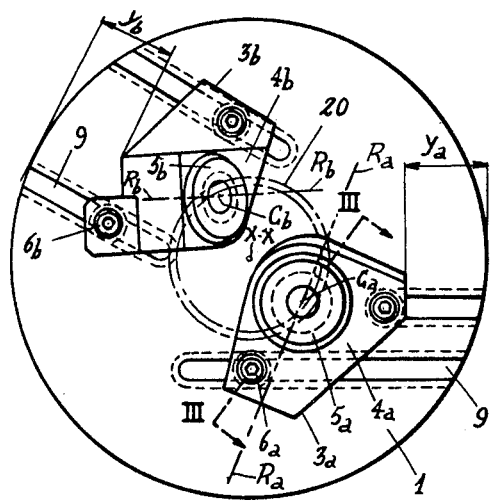
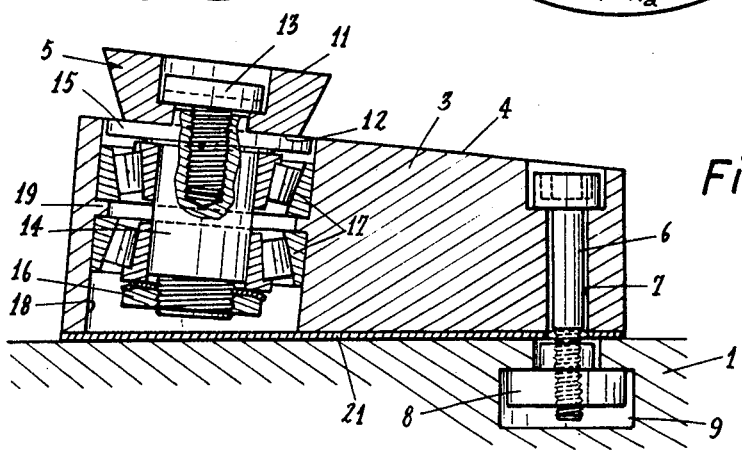
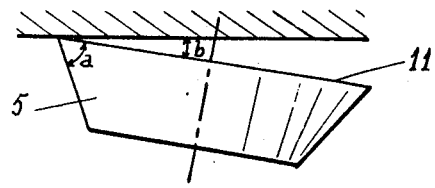
INVENTOR
ROMAIN GAMBINI
By Young + Thompson
ATTYS.

INVENTOR
ROMAIN GAMBINI
BY Young & Thompson
ATTYS.

United States Patent Office 3,515,029
Patented June 2, 1970

3,515,029
DEVICE FOR REMOVING THE BURR FROM THE ENDS OF CYLINDRICAL PARTS
Romain Gambini, Rue de la Chapelle, Landres, Meurthe-et-Moselle, France
Filed Aug. 30, 1968, Ser. No. 756,552
Int. Cl. B23c *3/02;* B26d *1/12*
U.S. Cl. 90—11     7 Claims

ABSTRACT OF THE DISCLOSURE

A device for removing burr from the ends of cylindrical parts such as pipes, tubes and round bars, said device comprising a rotatable plate, support-blocks adjustably mounted on the plate, cutting wheels mounted on the support-blocks respectively for free rotation and means for adjusting the position of the support-blocks relative to the axis of rotation. This device performs trimming operations at high speed with a fine surface finish for various pipe sizes.

---

This invention relates to a device for removing the burr from cylindrical parts having a circular cross-section such as tubes or round bars.

It is known that, after cutting parts of the above mentioned type either in the hot or cold state, rough edges are left either on the exterior or on the interior of the part.

In order to permit the suitable and effective joining of tubes, it is necessary to carry out a trimming operation which consists in removing the rough edges referred to above, otherwise known as burrs.

Trimming machines of known types are usually fitted with tools which are fixed on a rotary plate and which are applied to the end of the part to be machined. However, machines of this type are subject to a number of different disadvantages. Although the tools do in face remove the burr initially left on the part to be trimmed, the action of said tools results in the formation of further rough excrescences which are all the more pronounced as the feed of the cutting tool is greater.

Furthermore, the rough edge which is thus newly formed will increase with the degree of wear of the cutting tools. This makes it necessary to stop the machine at frequent intervals and such stoppages are prejudicial to continuous production.

Finally, these machines are usually fitted with three tools which, in the case of tubular parts, grind the outer edge, the end face and the inner edge. However, the tube end on which three annular facets are thus formed in incompatible with certain standards laid down for joining tube ends and a second finishing operation is required in some instances.

The disadvantages mentioned above are circumvented by means of the present invention.

In accordance with the invention, the device for removing the burr from the ends of cylindrical parts such as tubes and round bars and comprising a rotary plate on which the trimming tols are mounted is characterized in that said tools are constituted by cutting-wheels which are rotatably mounted on said rotary plate.

When the cutting-wheels carried by the rotary plate are brought into contact with the end face of the tube, said wheels rotate about their own axes by reaction and accordingly remove a chip of metal. It has been proved by experience that trimming operations can be carried out in this manner at high speeds and with a fine surface finish while at the same time increasing tool life to a very substantial extent.

As a preferred feature, the cutting-wheels are constituted by frusto-conical rings, said rings being freely rotatable on support-blocks which are secured to the rotary plate in an adjustable manner, the large base of the cutting-wheels being directed towards the side opposite to the rotary plate.

Should it be found necessary to form a straight end face and a frusto-conical face on the extremity of a tube, the invention advantageously provides the possibility of mounting on a same rotary plate two cutting-wheels whose cutting faces have different angles of inclination relative to the face of the rotary plate.

Further properties and advantages of the invention will become apparent from the description which now follows below, reference being made to the accompanying drawings which are given by way of example and not in any sense by way of limitation, and in which:

FIG. 1 is a diagrammatic view in perspective of a trimming or burr-removing device in accordance with FIG. 2 is a corresponding plan view;

FIG. 3 is an enlarged transverse sectional view of a support-block, this view being taken along line III—III of FIG. 2;

FIG. 4 is a diagrammatic axial sectional view of a cutting-wheel as shown separately;

FIG. 10 is an explanatory diagram in plan.

Figure 5:
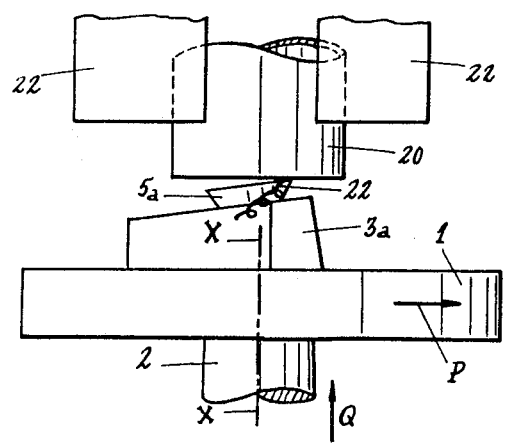
FIG. 5 is a diagrammatic view in elevation showing a tube which is undergoing a burr-removing operation.

In the embodiment of the invention which is shown in FIGS. 1 and 2, the trimming device which is mainly intended for tubes of small diameter comprises a plate 1 carried by a rotary shaft 2 which is driven in rotation by a motor (not shown in the figure). In the case corresponding to the example herein described in which it is desired to remove the burr from tubes and to form a plane annular facet at right angles to the axis (flat end face) and a frusto-conical annular facet (chamfer) which is located on the exterior, the plate 1 is fitted with two support-blocks 3a, 3b (as generally designated hereinafter by the reference numeral 3) of substantially frusto-pyramidal shape, the top oblique faces 4a, 4b of said blocks being each fitted with a rotary cutting-wheel 5a, 5b (as generally designated hereinafter by the reference numerals 4 and 5).

Each block 3 is secured to the plate 1 (as shown in FIG. 3) by means of two bolts 6 which traverse said blocks through bores 7 and which are screwed into nuts 8, said nuts being in turn engaged in dovetail guides 9 which are formed in the plate 1 and which permit of separate positional adjustment of the blocks 3 relative to the center of the plate 1. The guides 9 are placed angularly, thereby permitting the possibiity of setting the cutting-wheels 5a, 5b as near as possible to the support-blocks 3a, 3b.

The cutting-wheels 5 consist of frusto-conical rings formed of a metal having a high value of hardness such as, for example, tungsten carbide. The large base 11 of the ring constitutes the cutting edge whilst the small base 12 is disposed in opposite relation to the top face 4 of the support-block 3. The cutting angle $a$ which is made (as shown in FIG. 4) between the large base 11 and the generating-line of the cone varies substantially between 60 and 90°, depending on the hardness of the metal of the tube to be trimmed. For example, the angle $a$ is 60° in the case of mild steel and 90° in the case of a steel having a very high hardness number. The angle b which is made with the metal of the tube is usually comprised between 6 and 8°. This angle governs the slope which is given to the top face 4 of the block 3.

In order to machine the flat end face of the tube (block 3a), the angle will thus be comprised between 6 and 8°. In order to machine a chamfer of 30° (block 3b), the angle of slope of the face 4b will be 36° to 38°. The lines of greatest slope of the faces 4a, 4b are shown in FIG. 2 at $R_a$–$R_a$ or $R_b$–$R_b$. The diameter and thickness of the cutting-wheels 5 are not critical if the adjustment of the support-blocks 3 remains possible in respect of a given diameter of tube.

The cutting-wheels 5 are freely mounted for rotation on the block 3. In the example under consideration, each cutting-wheel is accordingly intended to be secured by means of a screw 13 to a spindle 14 provided with a platform 15 which serves to accommodate the small base 12 of the cutting-wheel. The spindle 14 is mounted on the support-block 3 by means of the rotary retainer cages of two roller-bearings 17 with reverse-tapered race cones which are clamped together by means of a nut 16. The stationary retainers are housed in a cavity 18 of the support-block 3 and separted by an annular spacer member 19 A very sturdy mounting can thus be provided for the cutting-wheel 5 while permitting of its free rotational motion.

The adjustment of the cutting-wheels 5 and consequently of the support-blocks 3 depends on the diameter of the tube 20 to be trimmed. As shown in FIG. 10, said adjustment is preferably such that, at the points of engagement $P_a$, $P_b$ with the tube 20, the angles $M_a$, $M_b$ which are made by the tangents $P_a t$, $P_b t$ with the radii $P_a C_e$, $P_b C_b$ which pass through the centers $C_a$, $C_b$ of the circumferences corresponding to the leading edges of the cutting-wheels are comprised between 10 and 15°, although the value last mentioned could be exceeded if necessary.

The direction of rotation of the cutting-wheel at the point of engagement $P_a$ and consequently the direction of removal of the metal chip or shaving 22a which is formed is directed towards the interior of the tube 20 if the center $C_a$ is placed on the same side as the tube 20 with respect to the tangent $P_a t$. Conversely, the direction of rotation of the cutting-wheel at the point of engagement $P_b$ and consequently the direction of removal of the metal shaving 22b is directed towards the exterior if the center $C_b$ is placed beyond the tangent $P_b t$ with respect to the tube 20.

The choice of relative positions of the cutting-wheels 5a, 5b at the points of engagement $P_a$, $P_b$ thus permits of particularly effective machining, especially if the end-face cutting-wheel 5a drives the metal shaving outwards and the chamfer-face cutting-wheel 5b drives the shaving inwards.

Figure 6:
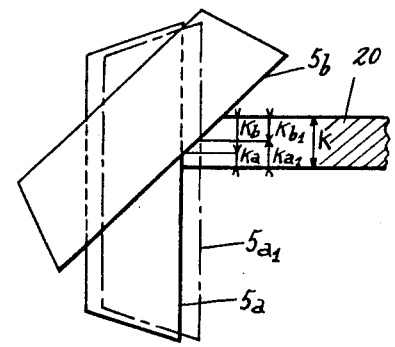
FIG. 6 is an explanatory diagram on a large scale which shows the mode of operation of the cutting-wheels.

The invention also provides another mode of relative adjustment of the positions of the cutting-wheels 5a, 5b in order to make the respective widths $K_a$ (FIG. 6) of the flat end face and $K_b$ of the chamfered face proportional to the desired value, the sum of said widths being such as to correspond to the thickness K of the tube 20. This adjustment consists in displacing the cutting-wheel 5a in height relative to the cutting-wheel 5b. In fact, it is apparent from FIG. 6 that, if the cutting-wheel 5a is displaced relative to the plate 1 and brought into the position $5a_1$, the width $Ka_1$ of the flat end face will accordingly become greater than $K_a$ whereas on the contrary, the width $Kb_1$ becomes smaller than $K_b$. This adjustment is carried out simply by means of shims such as the shim 21 (as shown in FIG. 3) which are placed between the plate 1 and the block 3a. It is thus possible to obtain as required a flat end face of the desired width irrespective of the thickness K of the tube 20.

When the support-blocks 3a, 3b are suitably adjusted, the following procedure is adopted (FIG. 5) in order to remove the burr from a tube 20:

Said tube is placed between jaws 22 which prevent the rotation of the tube and maintain this latter coaxial with the axis X—X of the plate 1. The plate is then driven in rotation in a direction such that the cutting-wheel 5b advances first into the work so as to form a chamfered edge. The speed of rotation of the plate 1 decreases as the diameter of the tube 20 increases. The cutting speed can reach on an average 180 to 200 meters per minute, that is to say practically double the speed obtained with fixed tools. For example, a speed of 640 r.p.m. can be adopted in the case of tubes 48.6 mm. in diameter and a speed of 225 r.p.m. can be adopted in the case of tubes 168 mm. in diameter.

The plate 1 is driven in rotation in the direction of the arrow P and is driven at the same time in translational motion towards the tube 20 in the direction of the arrow Q by any suitable feed means of known type. The feed decreases with the diameter (and therefore with the thickness of the tube).

When the plate 1 is thus driven in rotation in the direction of the arrow P, the cutting-wheels which come into contact with the edge of the tube which is to be trimmed are in turn driven in rotation by reaction in the directions $S_a$, $S_b$ which depend on the adjustment adopted in the case of the centers $C_a$, $C_b$ (as shown in FIG. 10). The cutting-wheels 5a, 5b then behave as rotating tools and each cut the metal so as to produce a shaving 22a, 22b which is directed either inwards or outwards, depending on the case.

Experience has shown that the device as thus constructed makes it possible to carry out a high-quality trimming operation at high speed. More specifically, there no longer remains any trace of burr and the work performed by the cutting-wheels 5 does not poduce any further roughness of surface.

For an equal cross-section of metal, the cutting speed is increased in considerable proportions with respect to devices of known types. Practical tests have in fact shown that $15/100$ mm. can be removed per pass by means of fixed tools whereas the cutting-wheels make it possible to remove at least $75/100$ mm. per pass. As a result of the introduction of the invention, an average gain in speed of the order of 60% has also been noted.

In view of the fact that, in addition, the point of engagement of the cutting-wheel rotates continuously, said cutting-wheel has time to cool to a suitable extent. It has been proved by experience that it is therefore possible without changing tools to obtain service lives which are 16 times those of fixed tools.

Figure 7:
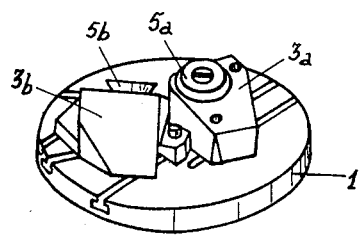
FIGS. 7 and 8 are views in perspective of another arrangement of the device for trimming tubes of small or large diameter.
Figure 8:
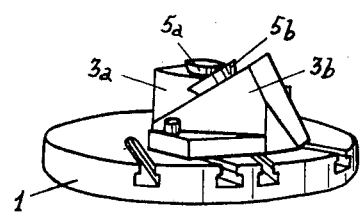

As will be understood, the arrangement of the plate 1 can be adapted to the diameter of the tube. Thus, FIGS. 7 to 9 show a form of construction which is suitable for tubes of both small and large diameter since the plate 1 is provided with both oblique grooves 9 as in the previous embodiment and with parallel grooves in the case of tubes of large diameter.

Figure 9:
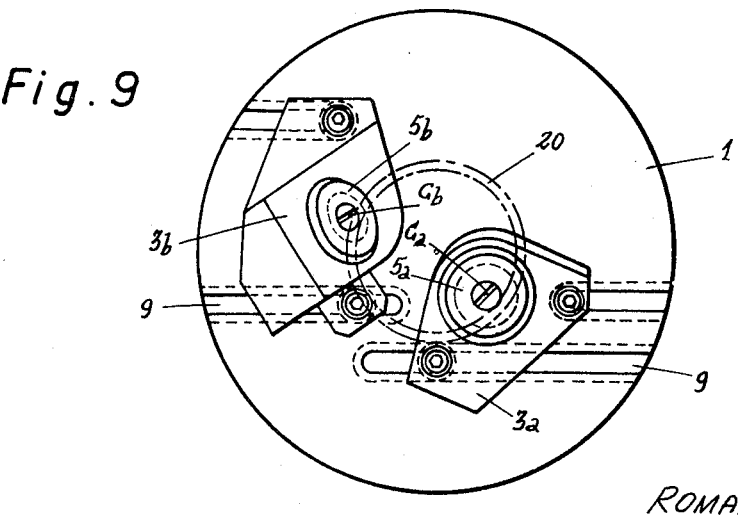
FIG. 9 is a plan view of another device.

FIG. 9 shows a rotary plate which is provided with only parallel grooves and accordingly serves to remove the burr from tubes of large diameter.

What we claim is:

1. A device for removing burr from the ends of cylindrical parts such as pipes, tubes and round bars, said devices comprising a plate which is rotatable about an axis, said plate having a free face, support-blocks adjustably mounted on said free face of the plate, cutting wheels each mounted on a respective support-block for free rotation and means for adjusting the position of said support-blocks on the free face of said plate relative to said axis of rotation.

2. A device as claimed in claim 1, wherein each of said cutting wheels comprises a cutting ring carried by a spindle which is mounted for free rotation within a recess in the respective support block by means of roller-bearings.

3. A device as claimed in claim 1, wherein each of said cutting wheels has a frusto-conical shape tapering towards the support-block.

4. A device as claimed in claim 1, wherein each of said support-blocks has a free face which carries the cutting wheel and which is inclined relative to the free face of said rotatable plate, said cutting wheel having a flat cutting face which is parallel to said free face of the support-block.

5. A device as claimed in claim 4, intended for trimming a tubular part so as to form a flat end face and an annular chamfer, wherein two cutting wheels are provided whose cutting faces are inclined at different angles relative to the free face of said rotatable plate.

6. A device as claimed in claim 4, wherein each of said support-blocks is adjustably mounted along guiding grooves formed in said rotatable plate.

7. A device as claimed in claim 5, wherein a shim is interposed between the free face of said rotatable plate and the support-block of that cutting wheel which forms the flat end face, the thickness of said shim depending on the desired height for said flat end face.

References Cited

UNITED STATES PATENTS

| 1,438,876 | 12/1922 | Thomas | 175—351 |
| 2,233,724 | 3/1941 | Bannister et al. | 29—96 |
| 2,651,223 | 9/1953 | Hahn | 29—103 X |
| 3,122,818 | 3/1964 | Nance | 29—105 |

GIL WEIDENFELD, Primary Examiner

U.S. Cl. X.R.

90—24; 29—105; 82—4